(12) United States Patent
Iles

(10) Patent No.: US 6,685,211 B2
(45) Date of Patent: Feb. 3, 2004

(54) TRAILER DOLLY

(76) Inventor: Arthur R. Iles, 9428 Rear Linwood, Shreveport, LA (US) 71106

( * ) Notice: Subject to any disclaimer, the term of this patent is extended or adjusted under 35 U.S.C. 154(b) by 0 days.

(21) Appl. No.: 10/151,993

(22) Filed: May 20, 2002

(65) Prior Publication Data

US 2002/0171224 A1 Nov. 21, 2002

Related U.S. Application Data

(60) Provisional application No. 60/292,283, filed on May 21, 2001.

(51) Int. Cl.[7] .............................................. B62D 61/12
(52) U.S. Cl. ...................... 280/476.1; 280/267; 280/83; 280/86.5
(58) Field of Search .............................. 280/476.1, 767, 280/762, 763.1, 82, 83, 86.5

(56) References Cited

U.S. PATENT DOCUMENTS

| 745,803 A | * | 12/1903 | Edeline | 280/83 |
|---|---|---|---|---|
| 2,534,575 A | | 12/1950 | Conley | |
| 2,634,986 A | * | 4/1953 | McDaniel | 280/489 |
| 2,828,973 A | | 4/1958 | Blackman | 280/476 |
| 2,844,389 A | | 7/1958 | Burnett | 280/476 |
| 3,281,161 A | | 10/1966 | Anderson | 280/476 |
| 3,865,405 A | | 2/1975 | Mitchell | 280/476 |
| 4,253,679 A | | 3/1981 | Sargent | 280/405 R |
| 4,491,338 A | | 1/1985 | ShelDrake | 280/405 R |
| 6,224,083 B1 | * | 5/2001 | Tyler | 280/476.1 |
| 6,419,247 B1 | * | 7/2002 | Moran | 280/86.5 |

* cited by examiner

Primary Examiner—Kevin Hurley
(74) Attorney, Agent, or Firm—John M. Harrison

(57) ABSTRACT

A load-bearing trailer dolly which connects a tongue-type boat, utility or other trailer to a towing vehicle and bears weight from the trailer during towing. In a preferred embodiment, the trailer dolly is characterized by an axle mounted on a pair of wheels and an axle mount upward-standing from the axle. A dolly frame height-adjustable on the axle mount by operation of a crank-operated threaded rod includes a forwardly-extending drawbar for attachment to the drawbar receptacle on the towing vehicle and a rearwardly-extending hitch bar fitted with a hitch ball for engaging the trailer tongue on the trailer. A shock-absorbing spring is fitted between the axle mount and the dolly frame for cushioning the dolly frame on the axle mount as the trailer is towed behind the towing vehicle.

15 Claims, 4 Drawing Sheets

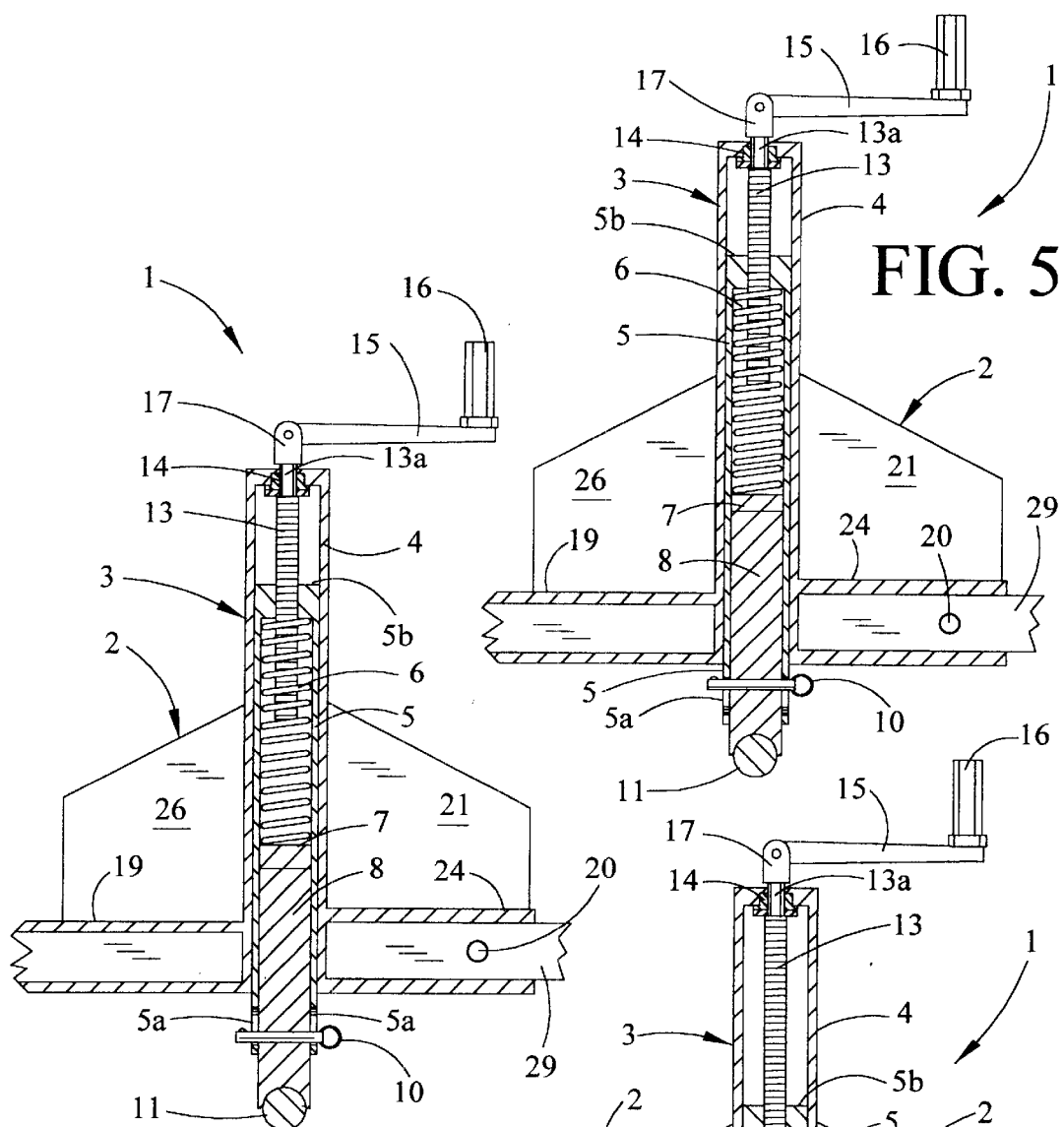
FIG. 5
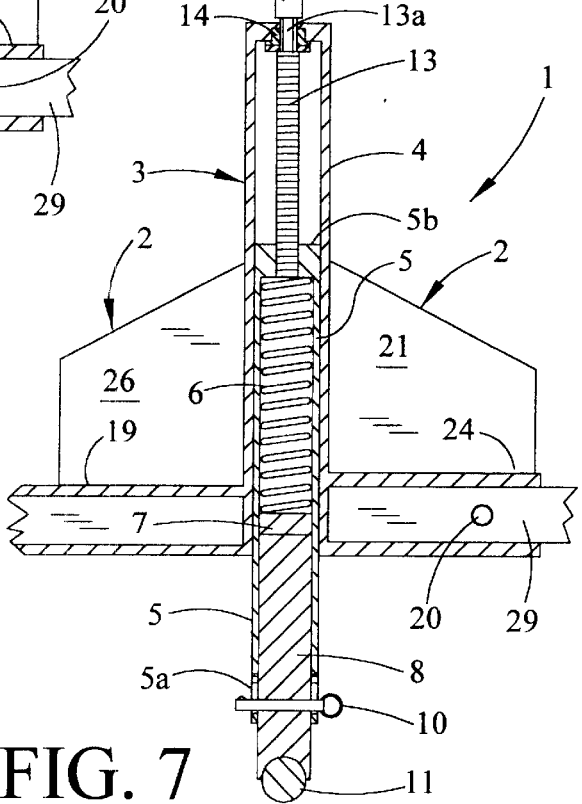
FIG. 6
FIG. 7

TRAILER DOLLY

CROSS-REFERENCE TO RELATED APPLICATIONS

This application claims the benefit of prior filed copending U.S. Provisional Application Serial No. 60/292,283, filed May 21, 2001.

BACKGROUND OF THE INVENTION

Field of the Invention

This invention relates to trailers such as boat and utility trailers and more particularly, to a load-bearing trailer dolly which connects a tongue-type trailer to a towing vehicle and bears weight from the trailer during towing. In a preferred embodiment, the trailer dolly is characterized by a an axle mount and axle assembly fitted with a pair of wheels which rest on the ground. A height-adjustable dolly frame provided on the axle mount includes a forwardly-extending drawbar for attachment to the drawbar receptacle on a towing vehicle and a rearwardly-extending hitch bar fitted with a hitch ball for engaging the trailer tongue on a trailer. A shock-absorbing spring is fitted between the axle mount and the dolly frame for cushioning the dolly frame on the axle mount and axle assembly as the trailer is towed behind the towing vehicle.

Trailers of various design such as boat trailers, utility trailers, travel trailers and the like are widely used to transport heavy vehicles or equipment. One of the problems frequently associated with using such trailers is that the forwardly-extending tongue on the trailer transmits much of the trailer weight to the hitch on the towing vehicle. This tends to overload the rear end of the towing vehicle and over time, results in excessive wear of the load-bearing elements on the vehicle, as well as adversely affecting vehicle stance and driveability.

A number of trailer dollies for connecting a trailer to a towing vehicle and bearing some of the trailer weight, are known in the art. Typical of these are the devices detailed in the following patents: U.S. Pat. No. 2,534,575, dated Dec. 19, 1950, to Conley, et al.; U.S. Pat. 2,828,973, dated Apr. 1, 1958; U.S. Pat. No. 2,844,389, dated Jul. 22, 1958; U.S. Pat. No. 3,281,161, dated Oct. 25, 1966; U.S. Pat. No. 3,865,405, dated Feb. 11, 1975; U.S. Pat. No. 4,253,679, dated Mar. 3, 1981; U.S. Pat. No. 4,491,338, dated Jan. 1, 1985.

An object of the present invention is to provide a load-bearing trailer dolly for connecting a tongue-type boat, utility or other trailer to a towing vehicle.

Another object of this invention is to provide a trailer dolly for connecting a trailer to a towing vehicle and bearing weight from the trailer.

Still another object of this invention is to provide a trailer dolly characterized by a dual-wheel axle assembly, a dolly frame mounted on the axle assembly, a drawbar extending forwardly from the dolly frame for coupling to the drawbar receiver on a towing vehicle and a hitch bar fitted with a hitch ball extending rearwardly from the dolly frame for removable coupling to the forwardly-extending trailer tongue on the trailer hitch of a trailer.

Yet another object of this invention is to provide a trailer dolly including a wheel-mounted axle, an axle mount extending upwardly from the axle, a dolly frame height-adjustably mounted on the axle mount by rotation of a crank-operated threaded rod, a drawbar extending forwardly from the dolly frame for coupling to the drawbar receiver of a towing vehicle, a hitch bar fitted with a hitch ball extending rearwardly from the dolly frame for coupling to the trailer tongue on a trailer, and a shock-absorbing spring interposed between the axle mount and the dolly frame for cushioning the dolly frame during towing of the trailer.

SUMMARY OF THE INVENTION

These and other objects of the invention are provided in a load-bearing trailer dolly which connects a tongue-type trailer to a towing vehicle and bears weight from the trailer during towing. In a preferred embodiment, the trailer dolly is characterized by an axle mounted on a pair of wheels and an axle mount upward-standing from the axle. A dolly frame height-adjustable on the axle mount by operation of a crank-operated threaded rod includes a forwardly-extending drawbar for attachment to the drawbar receptacle on a towing vehicle and a rearwardly-extending hitch bar fitted with a hitch ball for engaging the trailer tongue on a trailer. A shock-absorbing spring is fitted between the axle mount and the dolly frame for cushioning the dolly frame on the axle mount as the trailer is towed behind the towing vehicle.

BRIEF DESCRIPTION OF THE DRAWINGS

The invention will be better understood by reference to the accompanying drawings, wherein:

FIG. 5 is a sectional view, taken along section lines 5—5 in FIG. 3, of the trailer dolly, with the dolly frame shown adjusted to a low position on the axle mount component of the trailer dolly and the shock-absorbing spring element of the trailer dolly shown in the compressed configuration;

FIG. 6 is a sectional view, taken along section lines 5—5 in FIG. 3, of the trailer dolly illustrated in FIG. 5, with the shock-aborbing spring element of the trailer dolly shown in the relaxed configuration;

FIG. 7 is a sectional view, taken along section lines 5—5 in FIG. 3, of the trailer dolly, with the dolly frame shown adjusted to the uppermost position on the axle mount component of the trailer dolly.

DESCRIPTION OF THE PREFERRED EMBODIMENTS

Figure 1:
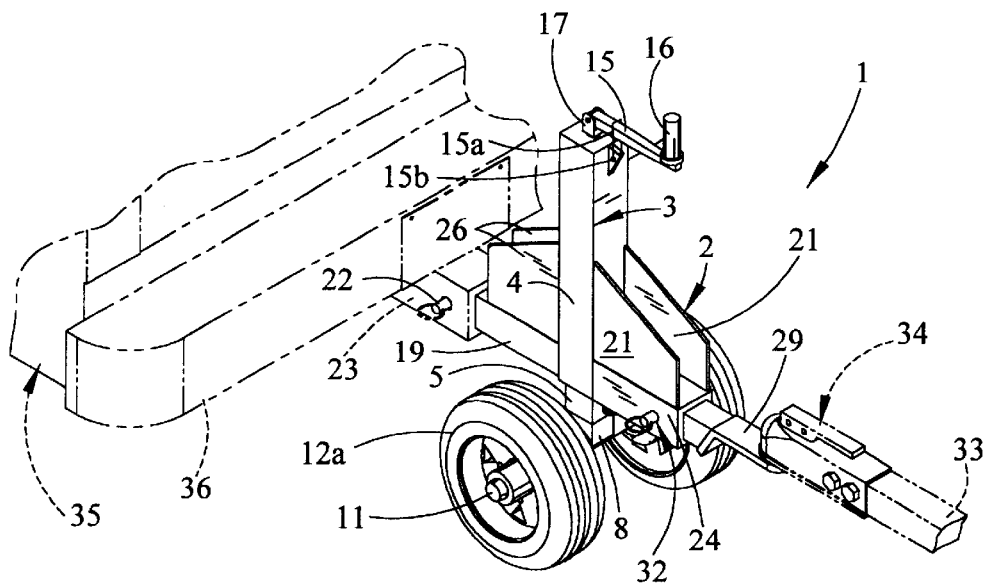
FIG. 1 is a perspective view of a preferred embodiment of the trailer dolly of this invention, connected to the trailer tongue (in phantom) of a trailer and to a drawbar receiver (also in phantom) of a towing vehicle.
Figure 3:
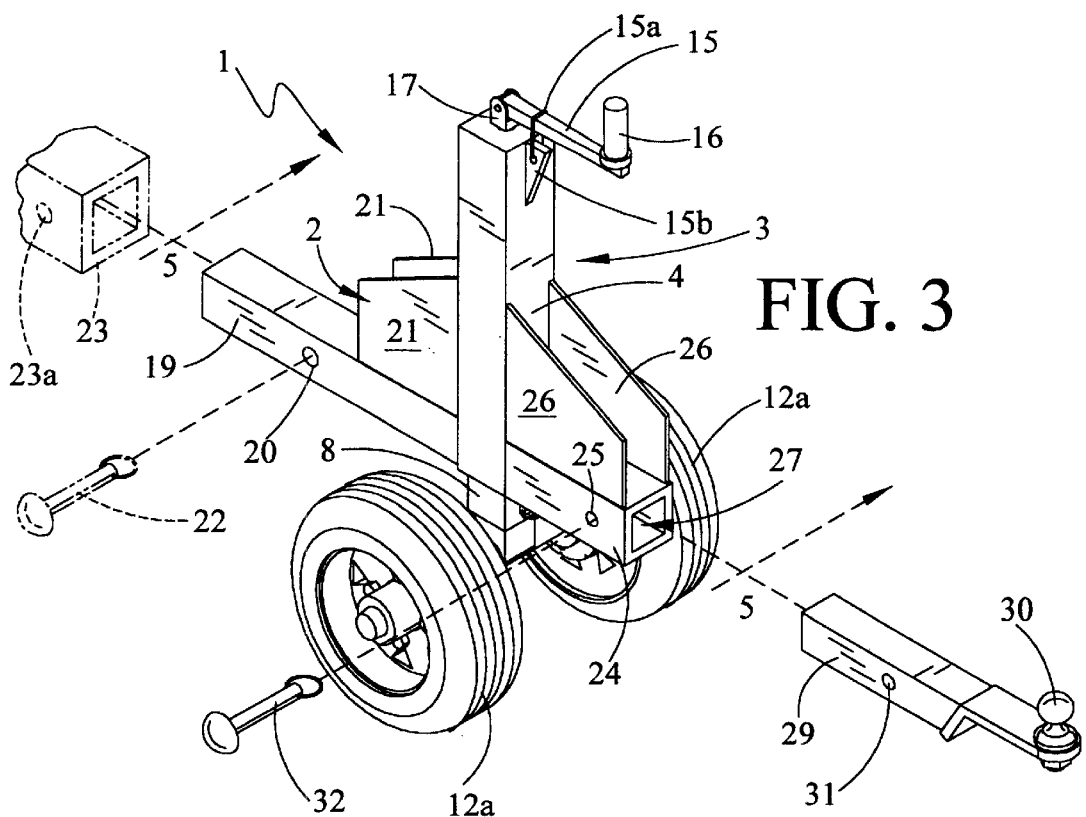
FIG. 3 is a perspective view of the trailer dolly, more particularly illustrating removable attachment of the hitch bar element to the dolly frame element and removable attachment of the drawbar element of the dolly frame to the drawbar receiver (in phantom) of a towing vehicle.
Figure 4:
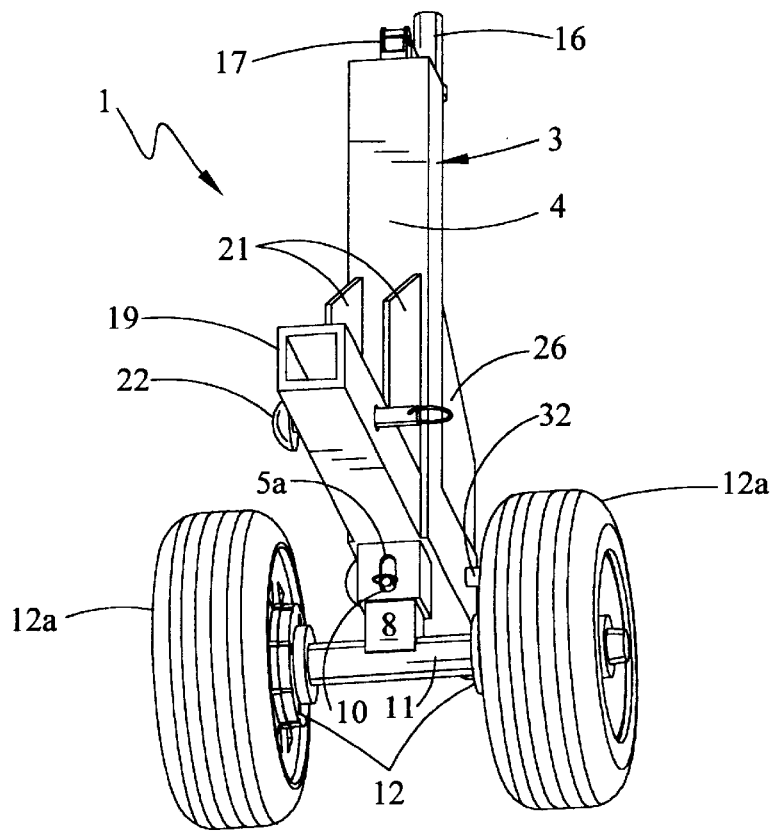
FIG. 4 is a front perspective view of the trailer dolly.

Referring to FIGS. 1, 3 and 4 and initially to FIG. 8 of the drawings, in a preferred embodiment the trailer dolly of this invention is generally illustrated by reference numeral 1. The trailer dolly 1 includes an elongated, cylindrical axle 11, having a circular wheel mount 12 rotatably mounted on each end thereof, in conventional fashion. A wheel 12a is mounted on each wheel mount 12, typically by means of lug bolts 12b. An elongated axle mount 8, typically having a rectangular cross-section, is upward-standing from the axle 11, about midway between the wheel mounts 12, and is capped by a rectangular washer 7 having a central washer opening 7a. As hereinafter further described, a dolly frame 2, typically constructed of steel square tubing elements, is height-adjustably mounted on the axle mount 8. The dolly frame 2 is characterized by a screw jack 3 having a vertical jack housing 4 and a horizontal drawbar 19, extending forwardly from the bottom end portion of the jack housing 4 in perpendicular relationship thereto. In similar fashion, a hitch bar receiver 24, having a hitch bar receiver bore 27, extends rearwardly from the bottom end portion of the jack housing 4, opposite the drawbar 19. As particularly illustrated in FIG. 4, a pair of adjacent drawbar gussets 21 typically extends between the jack housing 4 and the drawbar 19, and a pair of adjacent hitch bar gussets 26 extends between the jack housing 4 and the hitch bar receiver 24, as illustrated in FIG. 3, to strengthen the drawbar 19 and the hitch bar receiver 24, respectively, on the jack housing 4. As further illustrated in FIG. 3 and hereinafter further described, in typical application of the trailer dolly 1, the drawbar 19 is adapted for removable insertion in a drawbar receiver 23, extending rearwardly from beneath the rear bumper 36 (FIG. 1) of a towing vehicle 35. Aligned drawbar pin openings 20 (one of which is shown) are provided in opposite sides of the drawbar 19, and receive a drawbar pin 22 which is further extended through aligned drawbar receiver pin openings 23a (one of which is shown), provided in opposite sides of the drawbar receiver 23 to removably connect the trailer dolly 1 to the towing vehicle 35. As further illustrated in FIG. 3, the hitch bar receiver 24 of the dolly frame 2 receives a hitch bar 29, fitted with an upward-standing hitch ball 30 which engages the trailer hitch 34 (FIG. 1) on the trailer tongue 33 of a trailer (not illustrated). Accordingly, a hitch bar pin 32 is extended through aligned hitch bar receiver openings 25 (one of which is shown) provided in the hitch bar receiver 24 and further, through registering hitch bar pin openings 31 (one of which is shown), provided in opposite sides of the hitch bar 29, to removably mount the hitch bar 29 on the dolly frame 2 in application of the trailer dolly 1 as hereinafter further described.

Referring again to FIG. 8 and to FIGS. 5–7 of the drawings, the open bottom end of a rod housing 5, having a flat housing top 5b, receives the upper washer 7 end of the vertical axle mount 8, and the rod housing 5 is vertically slidably mounted on the axle mount 8 as hereinafter further described. As illustrated in FIGS. 5–7, a coiled spring 6 contained in the hollow interior of the rod housing 5 is interposed between the washer 7 of the axle mount 8 and the housing top 5b of the rod housing 5. As further illustrated in FIGS. 5–7, the upper, non-threaded rod end 13a of an elongated threaded rod 13 extends through a rod bushing 14 that is seated in a housing opening 4a (FIG. 8) of the jack housing 4 of the screw jack 3, and further protrudes upwardly through the housing opening 4a (FIG. 8) of the jack housing 4. The threaded rod 13 threadibly extends through a cap opening 5c (FIG. 8) provided in the housing top 5b of the rod housing 5, and supports the dolly frame 2 on the rod housing 5. An elongated hand crank 15, fitted with a rotatable crank handle 16, is attached to the protruding upper rod end 13a of the threaded rod 13 by means of a crank pivot 17, to facilitate selective bidirectional rotation of the threaded rod 13 in the rod bushing 14 and the housing top 5b of the rod housing 5. Accordingly, the threaded rod 13 can be rotated in one direction in the rod bushing 14 by operation of the hand crank 15 to thread the threaded rod 13 upwardly through the housing top 5b of the rod housing 5 and thus, facilitate upward adjustment of the dolly frame 2 with respect to the rod housing 5, as illustrated in FIG. 7. Rotation of the threaded rod 13 in the opposite direction in the rod bushing 14 threads the threaded rod 13 downwardly through the housing top 5b of the rod housing 5 to facilitate downward adjustment of the dolly frame 2 with respect to the rod housing 5, as illustrated in FIGS. 5 and 6. Accordingly, the threaded rod 13 extends downwardly through the center of the spring 6. As the threaded rod 13 threads upwardly or downwardly through the housing top 5b, the housing top 5b of the rod housing 5 remains stationary with respect to the washer 7 of the axle mount 8 and tension in the spring 6 is static. As illustrated in FIG. 8, a pair of parallel crank pin mounts 15b extends from one surface of the jack housing 4, and a crank pin 15a is capable of engaging the hand crank 15 and extension through a pair of aligned pin mount openings 15c provided in the crank pin mounts 15b, to prevent inadvertent rotation of the hand crank 15 and threaded rod 13 in application of the trailer dolly 1 as hereinafter described.

Figure 8:
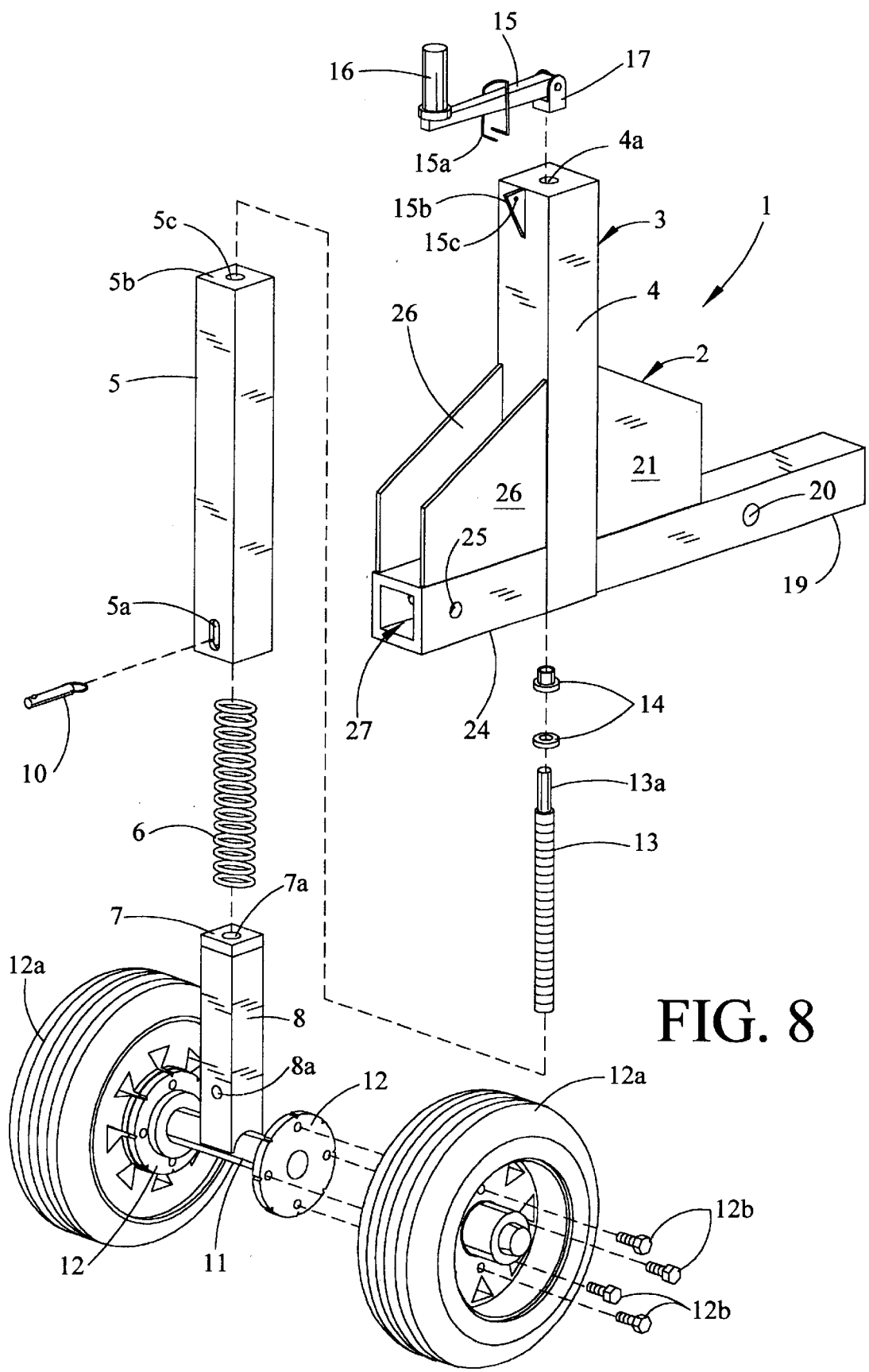
FIG. 8 is an exploded, perspective view of the trailer dolly.

As further illustrated in FIG. 8, vertical, elliptical housing slots 5a (one of which is shown) are provided in opposite sides of the rod housing 5, adjacent to the bottom end thereof, and each registers with a pair of circular slot pin openings 8a (one of which is shown), provided in opposite sides of the axle mount 8. A slot pin 10 is extended through the aligned housing slots 5a of the rod housing 5 and the registering aligned slot pin openings 8a of the axle mount 8, as illustrated in FIGS. 5–7, and limits sliding vertical movement of the rod housing 5 on the stationary axle mount 8 to the length of the housing slots 5a. In FIG. 5, the normal operational configuration of the trailer dolly 1 is shown as the trailer (not illustrated) is towed behind the towing vehicle 35 (FIG. 1), as hereinafter described, with the rod housing 5 resting on the slot pin 10 under the weight of the dolly frame 2 and the trailer tongue 33 (FIG. 1) of the towed trailer, the upper arcs of the respective housing slots 5a engaging the slot pin 10 and the spring 6 compressed between the washer 7 of the axle mount 8 and the housing top 5b of the rod housing 5. In FIG. 6, the dolly frame 2 and supporting rod housing 5 are shown in the upper position on the axle mount 8, as might occur under circumstances in which the wheels 12a of the trailer dolly 1 strike a bump, for example in a road (not illustrated). Accordingly, the rod housing 5 transiently rises on the axle mount 8 as the spring 6 relaxes and extends between the stationary washer 7 of the axle mount 8 and the upwardly-moving housing top 5b of the rod housing 5, until the lower arcs of the respective housing slots 5a engage the slot pin 10, stationary with the axle mount 8, and the slot pin 10 halts upward movement of the rod housing 5 on the axle mount 8. As the rod housing 5 subsequently falls on the axle mount 8 and returns to the normal operational configuration illustrated in FIG. 5, the spring 6 is compressed between the downwardly-moving housing top 5b of the rod housing 5 and the stationary washer 7 of the axle mount 8 and imparts shock-absorbing resiliency to the dolly frame 2 on the axle mount 8, throughout the length of the elliptical housing slots 5a until the upper arcs of the respective housing slots 5a again rest on the slot pin 10.

Figure 2:
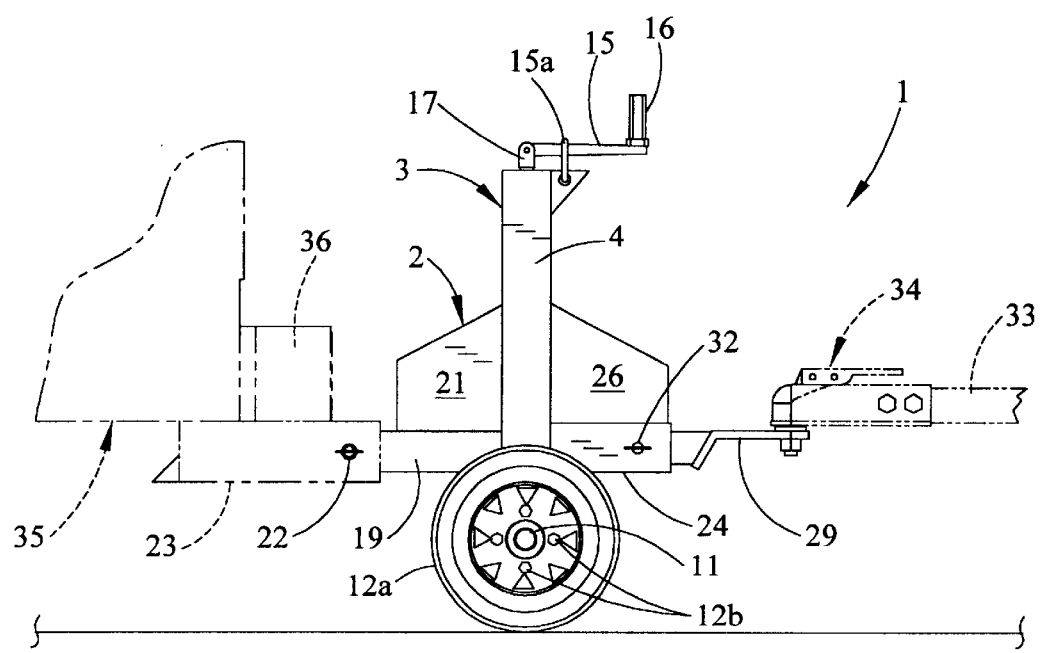
FIG. 2 is a side view of the trailer dolly illustrated in FIG. 1.

Referring again to FIGS. 1, 3, 5–8 and to FIG. 2 of the drawings, in typical application the trailer dolly 1 is designed to connect a tongue-type boat, utility or other trailer (not illustrated) to a towing vehicle 35, as illustrated in FIGS. 1 and 2, and bears a significant portion of the weight of the trailer imparted by the trailer tongue 33. With the wheels 12a of the trailer dolly 1 resting on the ground, the height of the dolly frame 2 on the rod housing 5 is initially adjusted, if necessary, to facilitate horizontally aligning the forwardly-extending drawbar 19 of the dolly frame 2 with the rearwardly-extending drawbar receiver 23 of the towing vehicle 35. This is accomplished by clockwise or counterclockwise rotation of the threaded rod 13 in the housing top 5b of the rod housing 5 by operation of the crank handle 16 to facilitate upwardly or downwardly threading the threaded rod 13 through the housing top 5b and raising or lowering, as necessary, the dolly frame 2 with respect to the rod housing 5. Accordingly, the dolly housing 2 is shown in the uppermost position on the rod housing 5 in FIG. 7, whereas the dolly housing 2 is shown in a lower position on the rod housing 5 in FIG. 6, as heretofore described. As illustrated in FIG. 3, the forwardly-extending drawbar 19 of the dolly frame 2 is next inserted in the drawbar receiver 23, extending rearwardly from beneath the rear bumper 36 of the towing vehicle 35, as illustrated in FIGS. 1 and 2. The drawbar pin 22 is extended through the oppositely-disposed drawbar pin openings 20 of the drawbar 19, and through registering, oppositely-disposed drawbar receiver pin openings 23a, provided in the drawbar receiver 23. The hitch bar 29 of the trailer dolly 1 is then connected to the dolly frame 2, by inserting the hitch bar 29 in the hitch bar receiver bore 27 of the hitch bar receiver 24 and extending the hitch bar pin 32 through the hitch bar receiver openings 25 of the hitch bar receiver 24 and registering hitch bar pin openings 31 of the hitch bar 29. The height of the trailer hitch 34 of the trailer (not illustrated) is then adjusted, as needed, using the conventional height-adjusting crank mechanism (not illustrated) on the trailer tongue 33 of the trailer to facilitate positioning the trailer hitch 34 above the hitch ball 30 on the hitch bar 29, and the trailer hitch 34 is next lowered using the trailer tongue height-adjusting crank mechanism to couple the trailer hitch 34 with the hitch ball 30. As illustrated in FIG. 8, the crank pin 15a is typically fitted around the hand crank 15 and extended through the aligned pin mount openings 15c of the crank pin mounts 15b, to prevent inadvertent rotation of the hand crank 15 and threaded rod 13. The wheels 12a of the trailer dolly 1 bear the weight exerted on the dolly frame 2 by the trailer tongue 33 of the trailer as the towing vehicle 35 is operated to tow the trailer.

Referring again to FIGS. 1 and 2 of the drawings, it will be appreciated by those skilled in the art that the weight of the trailer from the trailer tongue 33 is exerted on the hitch bar 29 of the dolly frame 2, and the wheels 12a of the trailer dolly 1 bear the weight of the trailer tongue 33 and the dolly frame 2 to prevent high weight loads of the trailer from bearing on the shock-absorbing and other load-bearing members of the towing vehicle 35. It will be appreciated from a consideration of FIGS. 5 and 6 that the shock-absorbing spring 6, interposed between the housing top 5b of the rod housing 5 and the washer 7 of the axle mount 8, facilitates cushioning of the dolly frame 2 on the axle mount 8 as the wheels 12a strike bumps or dips in a road (not illustrated), as heretofore described. The trailer dolly 1 is capable of use with any type of towing vehicle having a rearwardly-extending drawbar receptacle 23 and any type of trailer such as boat trailers, utility trailers and the like, fitted with a tongue-type trailer hitch 34 for attachment to the hitch ball 30 of the trailer dolly 1.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A trailer dolly for connecting a trailer to a towing vehicle and supporting weight from the trailer to the ground, said trailer dolly comprising:
   at least one wheel for engaging the ground and an axle mount carried by said at least one wheel;
   a rod housing slidably carried by said axle mount;
   a threaded rod threadably engaging said rod housing;
   a dolly frame carried by said threaded rod;
   a hitch ball carried by said dolly frame for attachment to the trailer;
   a drawbar extending from said dolly frame for attachment to the towing vehicle; and
   a shock absorbing mechanism provided between said axle mount and said rod housing, whereby said dolly frame is selectively adjusted in height with respect to the ground responsive to rotation of said threaded rod.

2. The trailer dolly of claim 1 comprising a hitch bar extending from said dolly frame and wherein said hitch ball is provided on said hitch bar.

3. The trailer dolly of claim 1 wherein said shock-absorbing mechanism comprises a coiled spring interposed between said axle mount and said rod housing.

4. The trailer dolly of claim 3 comprising a hitch bar extending from said dolly frame and wherein said hitch ball is provided on said hitch bar.

5. A trailer dolly for connecting a trailer to a towing vehicle and supporting weight from the trailer on the ground, said trailer dolly comprising:
   a pair of wheels for engaging the ground;
   an axle spanning said pair of wheels;
   an axle mount upward-standing from said axle;
   a rod housing vertically displaceably mounted on said axle mount;
   a coiled spring interposed between said axle mount and said rod housing;
   a threaded rod threadably engaging said rod housing; and
   a dolly frame carried by said threaded rod for removable attachment to the towing vehicle and the trailer, respectively, and a hitch ball carried by said dolly frame for attachment to the trailer, whereby said dolly frame is selectively adjusted in height with respect to said rod housing responsive to rotation of said threaded rod.

6. The trailer dolly of claim 5 comprising a drawbar extending from said dolly frame for attachment to the towing vehicle.

7. The trailer dolly of claim 6 comprising a hitch ball carried by said dolly frame for attachment to the trailer.

8. The trailer dolly of claim 5 comprising a hitch bar provided on said dolly frame and wherein said hitch ball is provided on said hitch bar.

9. The trailer dolly of claim 8 comprising a drawbar extending from said dolly frame for attachment to the towing vehicle.

10. A trailer dolly for connecting a trailer to a towing vehicle and supporting weight from the trailer on the ground, said trailer dolly comprising:
    at least one wheel for engaging the ground;
    a rod housing vertically displaceably carried by said at least one wheel;
    a shock-absorbing mechanism provided between said at least one wheel and said rod housing;
    a threaded rod threadibly engaging said rod housing;
    a hand crank carried by said threaded rod for selectively rotating said threaded rod;
    a dolly frame carried by said threaded rod for removable attachment to the towing vehicle and the trailer, respectively, whereby said dolly frame is selectively adjusted in height with respect to the ground responsive to rotation of said threaded rod; and a crank lock mechanism carried by said dolly fame for removably engaging said hand crank and preventing inadvertent rotation of said threaded rod.

11. The trailer dolly of claim 10 comprising a hitch bar extending from said dolly frame and a hitch ball carried by said hitch bar for attachment to the trailer.

12. The trailer dolly of claim 11 comprising a drawbar extending from said dolly frame for attachment to the towing vehicle.

13. The trailer dolly of claim 10 wherein said crank lock mechanism comprises a pair of crank pin mounts provided on said dolly frame and a crank pin for removably engaging said hand crank and said crank pin mounts.

14. The trailer dolly of claim 13 comprising a hitch bar extending from said dolly frame and a hitch ball carried by said hitch bar for attachment to the trailer.

15. The trailer dolly of claim 14 comprising a drawbar extending from said dolly fame for attachment to the towing vehicle.

* * * * *